(12) United States Patent
Tanaka

(10) Patent No.: US 7,952,653 B2
(45) Date of Patent: May 31, 2011

(54) LIQUID CRYSTAL DISPLAY DEVICE HAVING ESD PROTECTION CIRCUIT AND METHOD FOR MANUFACTURING THE SAME

(75) Inventor: Hideo Tanaka, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 1069 days.

(21) Appl. No.: 10/596,843

(22) PCT Filed: Dec. 14, 2004

(86) PCT No.: PCT/IB2004/052796
§ 371 (c)(1),
(2), (4) Date: Jun. 27, 2006

(87) PCT Pub. No.: WO2005/073792
PCT Pub. Date: Aug. 11, 2005

(65) Prior Publication Data
US 2009/0021659 A1 Jan. 22, 2009

(30) Foreign Application Priority Data
Jan. 5, 2004 (WO) .................. PCT/IB2004/000065

(51) Int. Cl.
*G02F 1/136* (2006.01)

(52) U.S. Cl. .......................................... 349/51; 349/40

(58) Field of Classification Search .................. None
See application file for complete search history.

(56) References Cited

U.S. PATENT DOCUMENTS

| | | | | |
|---|---|---|---|---|
| 5,781,256 A | * | 7/1998 | Inoue et al. | 349/51 |
| 5,815,223 A | * | 9/1998 | Watanabe et al. | 349/42 |
| 6,407,791 B1 | * | 6/2002 | Suzuki et al. | 349/129 |
| 2002/0158995 A1 | * | 10/2002 | Hwang et al. | 349/43 |
| 2003/0174267 A1 | * | 9/2003 | Nimura | 349/113 |

* cited by examiner

*Primary Examiner* — David Nelms
*Assistant Examiner* — Lucy P Chien
(74) *Attorney, Agent, or Firm* — Birch, Stewart, Kolasch & Birch, LLP

(57) ABSTRACT

A source electrode and a drain electrode on a silicon oxide film (31) each has a double-layered structure of an ITO film (32), a transparent electrode, and a metal film (33) formed on the ITO film (32). A gap (35), no source electrode and drain electrode region, is formed between the source electrode and the drain electrode. A silicon nitride film (34) (a gate insulating film) is formed on the source electrode and the drain electrode and in the gap (35). The silicon nitride film (34) is a first region $D_1$ having a relatively large thickness and a second region $D_2$ having a relatively small thickness. The region $D_2$ of the silicon nitride film (34) is provided with an MIM structure. A gate bus layer (36) is formed on the silicon nitride film (34). An MIM structure is formed in the second region $D_2$.

9 Claims, 5 Drawing Sheets

(a)    (b)

LIQUID CRYSTAL DISPLAY DEVICE HAVING ESD PROTECTION CIRCUIT AND METHOD FOR MANUFACTURING THE SAME

TECHNICAL FIELD

The present invention relates to a liquid crystal display device and a method for manufacturing the same, and more particularly, to a liquid crystal display device having an ESD protection circuit and a method for manufacturing the same.

BACKGROUND ART

An active matrix type liquid crystal display device is provided with an ESD protection circuit to protect the device from harmful electrostatic discharge which amounts to several tens of thousands of volts. As a conventional ESD protection circuit, a diode using a saturation region operation of a TFT (thin film transistor) is used.

FIG. 1 shows a conventional ESD protection circuit, FIG. 1(a) shows an equivalent circuit, and FIG. 1(b) shows wiring patterns in an ESD protection circuit.

In FIG. 1(b), the ESD protection circuit uses a TFT 3 comprising a source bus 1 and a gate bus layer 2 provided on the source bus 1. More specifically, a diode using the saturation region operation of this TFT 3 is used as the ESD protection circuit.

FIG. 2 is a sectional view along II-II line in FIG. 1(b). In FIG. 2, a light shield film 12 for preventing the light from directly entering the TFT is provided on a glass substrate 10, which is an insulating transparent substrate. This light shield film 12 is formed in a region on the glass substrate corresponding to the region including the region (gap) between a source electrode and a drain electrode. A silicon oxide film 11, which is an interlayer insulating film, is formed on the glass substrate 10 on which the light shield film 12 is formed.

A source electrode (source bus) and a drain electrode are formed on the silicon oxide film 11. These source electrode and drain electrode each have a double-layered structure consisting of an ITO film 13 and a metal film 14 formed on the ITO film 13, both of which are transparent electrodes. A gap is formed between the source electrode and the drain electrode, and an a-Si film 15, which is a semiconductor film, is formed in the gap and on the source electrode and the drain electrode around the gap.

A silicon nitride film 16, which is a gate insulating film, is formed on the a-Si film 15. A contact-hole 16a is formed in this silicon nitride film 16. A gate bus layer 17 is formed in the region including the gap of the silicon nitride film 16. A film 17a which is the same layer as the gate bus layer 17 formed in the contact-hole 16a is connected to the source electrode.

Such a structure requires one ESD protection circuit TFT per one diode, and therefore as shown in FIG. 1(b), at least two TFTs per one bus line are required. Furthermore, since this diode uses a TFT, it has a complicated structure and requires a relatively wide space. Moreover, during the operation of the TFT in a saturation region, the current rises with respect to the voltage like a quadratic curve, and so it is not preferable from the standpoint of a diode characteristic.

DISCLOSURE

It is an object of the present invention to provide a liquid crystal display device saving the space and having an ESD protection circuit with an excellent diode characteristic, and to provide a method for manufacturing a liquid crystal display device without increasing photolithography processes.

The liquid crystal display device having an ESD protection circuit according to the present invention comprises a source electrode and a drain electrode formed on an insulating substrate via an interlayer insulating film, a gate insulating film having a relatively thin film portion partially on the source electrode and the drain electrode, and a gate bus layer formed on the gate insulating film including at least the thin film portion, wherein an MIM structure is configured by the source electrode, the drain electrode, the gate insulating film in the thin film portion and the gate bus layer.

According to this structure, since the MIM structure is used as the ESD protection circuit, it is possible to form the MIM structure in a smaller occupied area which has a better characteristic than a characteristic in a case that a TFT saturation region is used and thereby realize space saving and a high degree of integration.

In the liquid crystal display device according to the present invention, a plurality of MIM structures are preferably connected in series. Furthermore, in the liquid crystal display device according to the present invention, the thin film portion preferably has a thickness of 50 nm or less.

A method for manufacturing a liquid crystal display device having an ESD protection circuit according to the present invention comprises the steps of forming a source electrode and a drain electrode on an insulating substrate via an interlayer insulating film, forming a gate insulating film having a relatively thin film portion partially on the source electrode and the drain electrode, and forming a gate bus layer on the gate insulating film including at least the thin film portion, wherein an MIM structure is configured by the source electrode, the drain electrode, the gate insulating film in the thin film portion and the gate bus layer.

In the method for manufacturing a liquid crystal display device according to the present invention, the step of forming the thin film portion in the gate insulating film preferably includes the steps of forming an organic film on the gate insulating film, exposing the organic film using a mask for which the amount of exposure in the thin film portion is relatively low, developing the exposed organic film, exposing the gate insulating film in the thin film portion by reducing the thickness of the developed organic film and forming a hollow portion by etching the exposed gate insulating film.

According to this method, since the MIM is used for the ESD protection circuit, it is possible to form an ESD protection circuit in simpler processes and in a smaller region. In this case, using a mask for which amount of exposure is varied depending on a place allows the ESD protection circuit to be formed without increasing mask processes.

In the method for manufacturing a liquid crystal display device according to the present invention, the mask preferably includes a portion having relatively large amount of exposure, the organic film is exposed through the portion, and a contact-hole is formed in a region where the exposed organic film is developed.

In the method for manufacturing a liquid crystal display device according to the present invention, a half-tone mask or a diffraction mask is preferably used as the mask corresponding to the region in which the thin film portion having a relatively low amount of exposure is formed.

DESCRIPTION OF DRAWINGS

FIG. 1(a) shows an equivalent circuit, and FIG. 1(b) shows wiring patterns in ESD protection circuits;

FIG. 3(a) shows an equivalent circuit, and FIG. 3(b) shows wiring patterns in an ESD protection circuit;

BEST MODE

Figure 1:
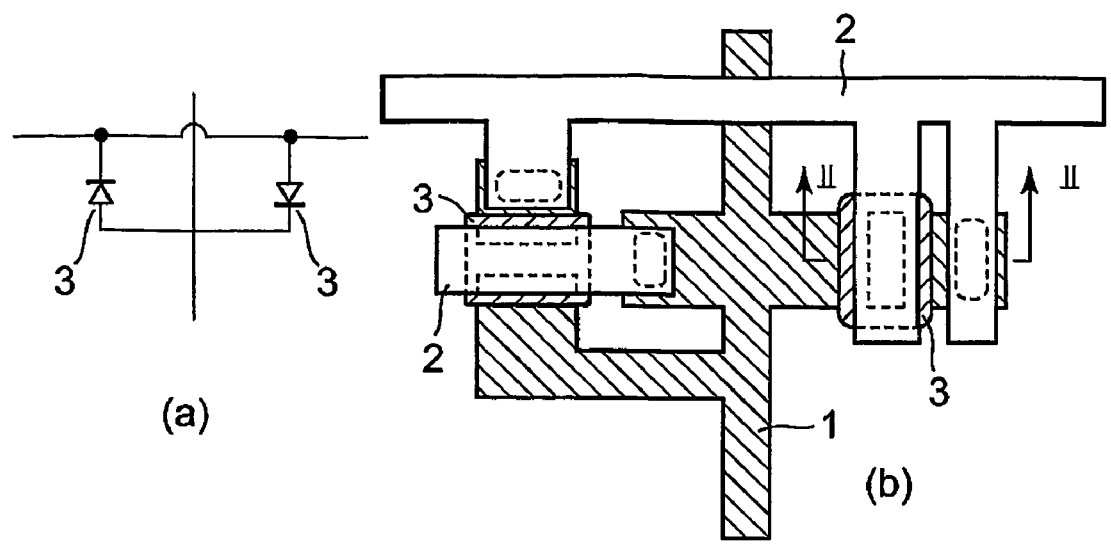
FIG. 1 shows a conventional ESD protection circuit.
Figure 2:
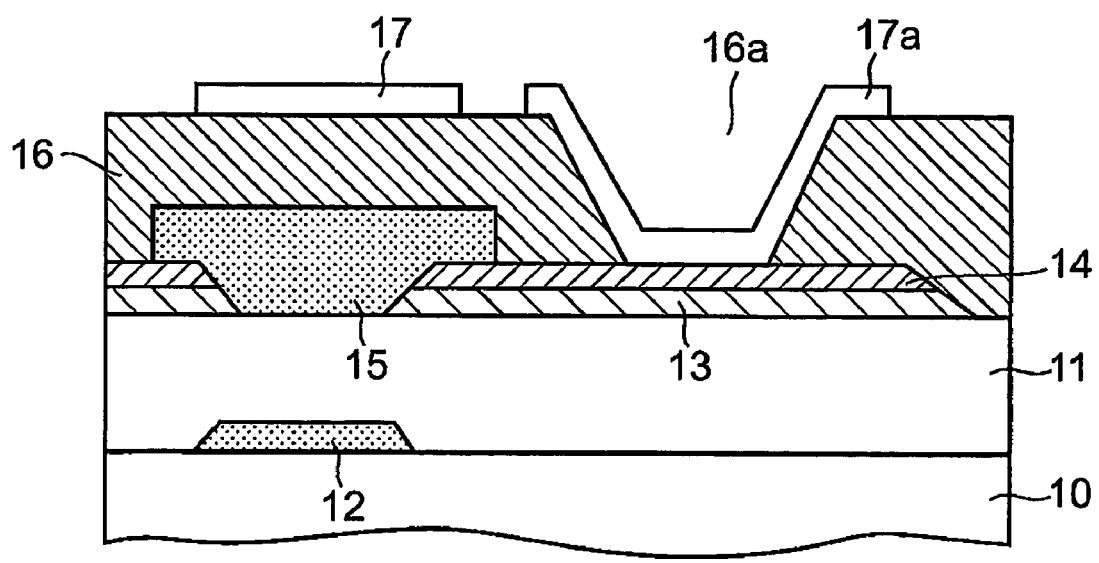
FIG. 2 is a sectional view along II-II line in FIG. 1(b)
Figure 3:
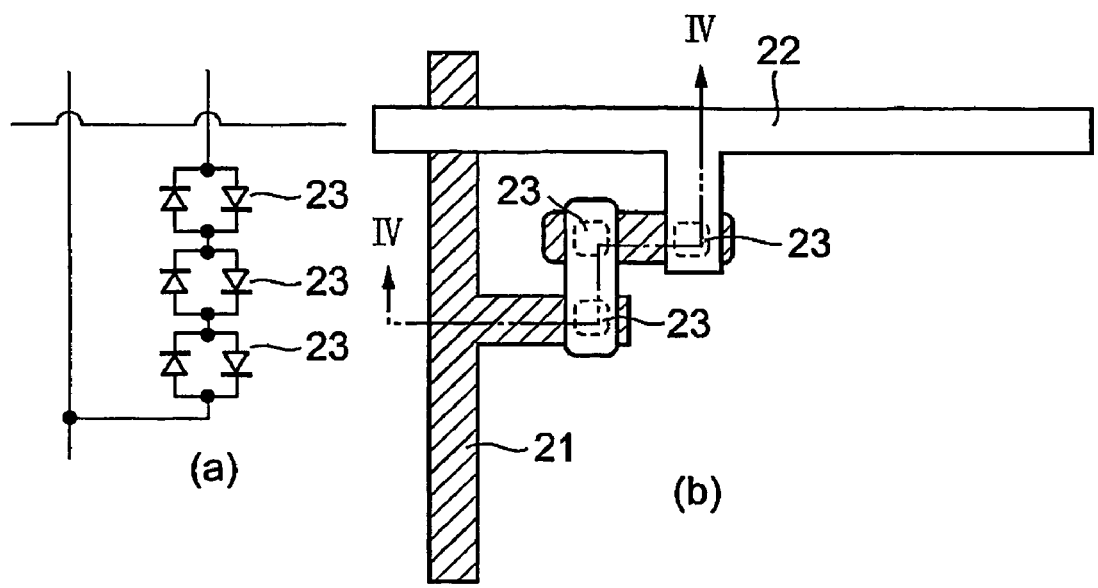
FIG. 3 shows an ESD protection circuit according to an Embodiment of the present invention.

With reference now to the attached drawings, an embodiment of the present invention will be explained in detail below. FIG. 3 shows an ESD protection circuit according to an Embodiment of the present invention, FIG. 3(a) shows an equivalent circuit, and FIG. 3(b) shows wiring patterns in an ESD protection circuit.

Figure 4:
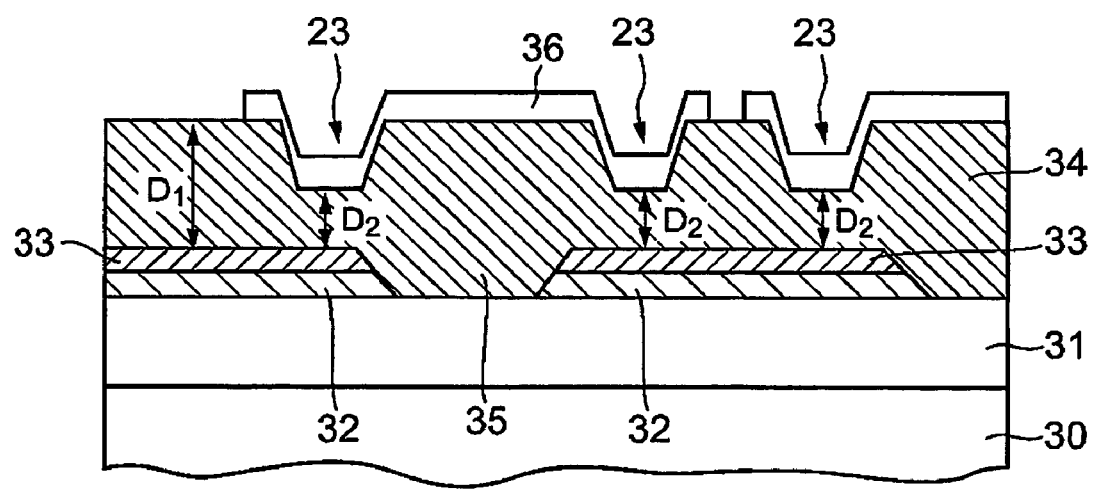
FIG. 4 is a sectional view along IV-IV line in FIG. 3(b)

In FIG. 3(b), an MIM (Metal-Insulator-Metal) 23 comprising a source bus 21 and a gate bus layer (gate bus and guard ring) 22 provided on the source bus 21 is used for the ESD protection circuit. More specifically, the diode of this MIM 23 is used as the ESD protection circuit. As shown in FIG. 3(a), a case where three MIMs are connected in series will be explained here. When the current leakage occurs in the ESD protection circuit, the power consumption of the overall device increases. Therefore, it is preferable to connect as many diodes as possible in series for the ESD protection circuit from the standpoint of reducing a leakage current. FIG. 4 is a sectional view along IV-IV line in FIG. 3(b). In FIG. 4, a silicon oxide film (e.g., $SiO_2$) 31, which is an interlayer insulating film, is formed on a glass substrate 30 which is an insulating transparent substrate. It is also possible to use a quartz substrate or a transparent plastic substrate instead of a glass substrate. When the liquid crystal display device is of a semitransparent type, an insulating transparent substrate is used in this way, but when the liquid crystal display device is of a reflective type, a silicon substrate may also be used.

A source electrode and a drain electrode are formed on the silicon oxide film 31. These source electrode and drain electrode have a double-layered structure consisting of an ITO film 32 and a metal film 33 formed on the ITO film 32, both of which are transparent electrodes. The source electrode and the drain electrode are not limited to the double-layered structure, but can be also configured by one layer or three or more layers. A gap 35 without source electrode and drain electrode is formed between the source electrode and the drain electrode.

A silicon nitride film 34, which is a gate insulating film, is formed on the source electrode and the drain electrode, and in the gap 35. This silicon nitride film (e.g., SiNx) 34 has a relatively thick region $D_1$ and a relatively thin region $D_2$. The region $D_2$ of the silicon nitride film 34 is provided with an MIM structure. This region $D_2$ can be formed using a method which will be explained later. The region $D_2$ preferably has a thickness of 50 nm or less considering that this will secure sufficient ON current for the MIM.

A gate bus layer 36 is formed on the silicon nitride film 34 having this region $D_2$. In this way, an MIM structure is formed in the region $D_2$. The gate bus layer 36 is patterned using a photolithography method and etching as required.

Thus, the MIM structure is used as the ESD protection circuit for the liquid crystal display device having an ESD protection circuit of the present invention. For this reason, as is evident from FIG. 4, three MIMs 23 can be provided in a narrow region. This makes it possible to realize space saving and a high degree of integration in the device.

For example, in the case of a conventional ESD protection circuit using TFTs, two TFTs correspond to one MIM. Therefore, as shown in FIG. 4, when a circuit equivalent to that with three MIMs is created, six TFTs need to be formed. When compared to the region in which six TFTs are formed, the region in which three MIMs are formed can realize an ESD protection circuit with a smaller space.

Furthermore, as described above, the diodes for the ESD protection circuit are preferably connected in series in consideration of a leakage current. As in the case of the present invention, where the ESD protection circuit is configured by MIMs, the structure of each MIM itself is simple and the area occupied by the MIM is small, and therefore connecting a plurality of MIMs in series would produce no big problems. But when a plurality of TFTs are connected in series, the structure of each TFT itself is complicated and the area occupied by the TFT is large, and therefore it is not easy to construct the structure with TFTs with a small space.

Figure 5:
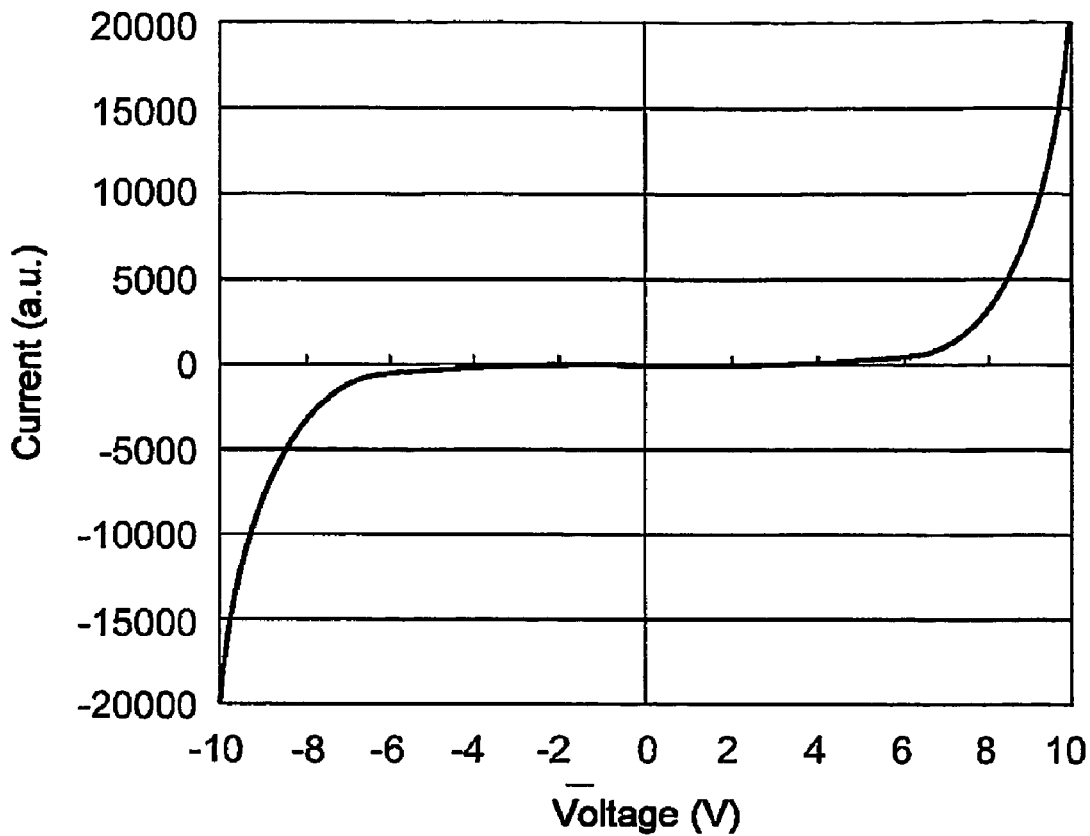
FIG. 5 shows a current-voltage characteristic of an ESD protection circuit according to an Embodiment of the present invention.
Figure 6:
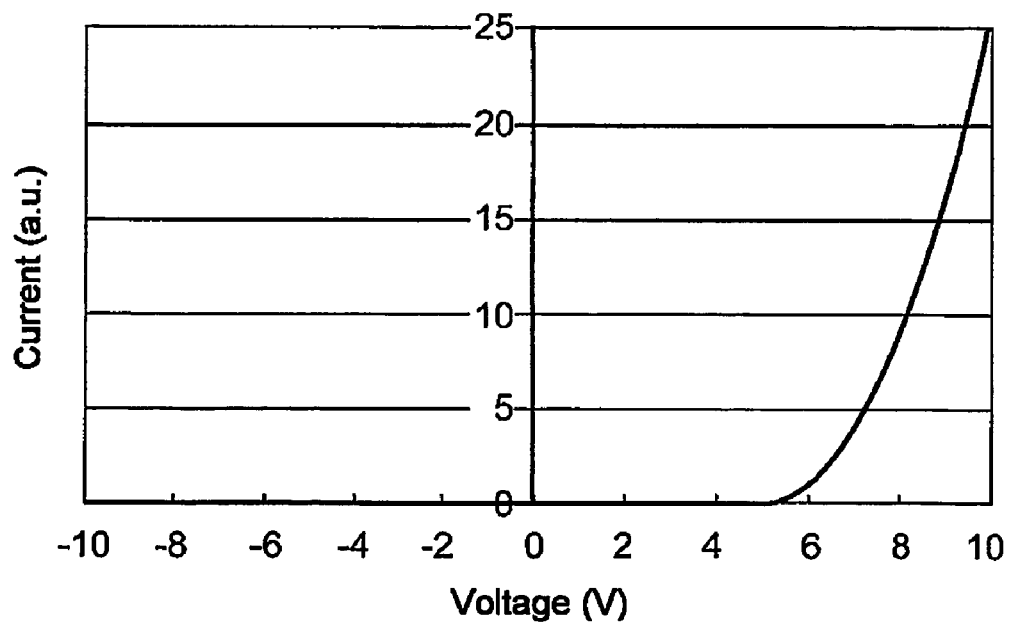
FIG. 6 shows a current-voltage characteristic of a conventional ESD protection circuit.

FIG. 5 shows a current-voltage characteristic of an ESD protection circuit according to an Embodiment of the present invention and FIG. 6 shows a current-voltage characteristic of a conventional ESD protection circuit. As shown in FIG. 5, the current-voltage characteristic of an MIM can be approximated by $I=k[exp(V)-1]$ (where, k:constant, I: current, V: voltage). On the other hand, as shown in FIG. 6, the current-voltage characteristic of a saturation region of a TFT can be approximated by $I=k'(V_g-V_{th})^2$ (where, $V_G>V_{th}$). In FIG. 5 and FIG. 6, k and k' denote constants, I denotes a current and V denotes a voltage.

As is evident from FIG. 5 and FIG. 6, the rise of the current value of the MIM is steeper than that of the TFT. Therefore, when used as a diode for the ESD protection circuit, the MIM is better.

Figure 7:
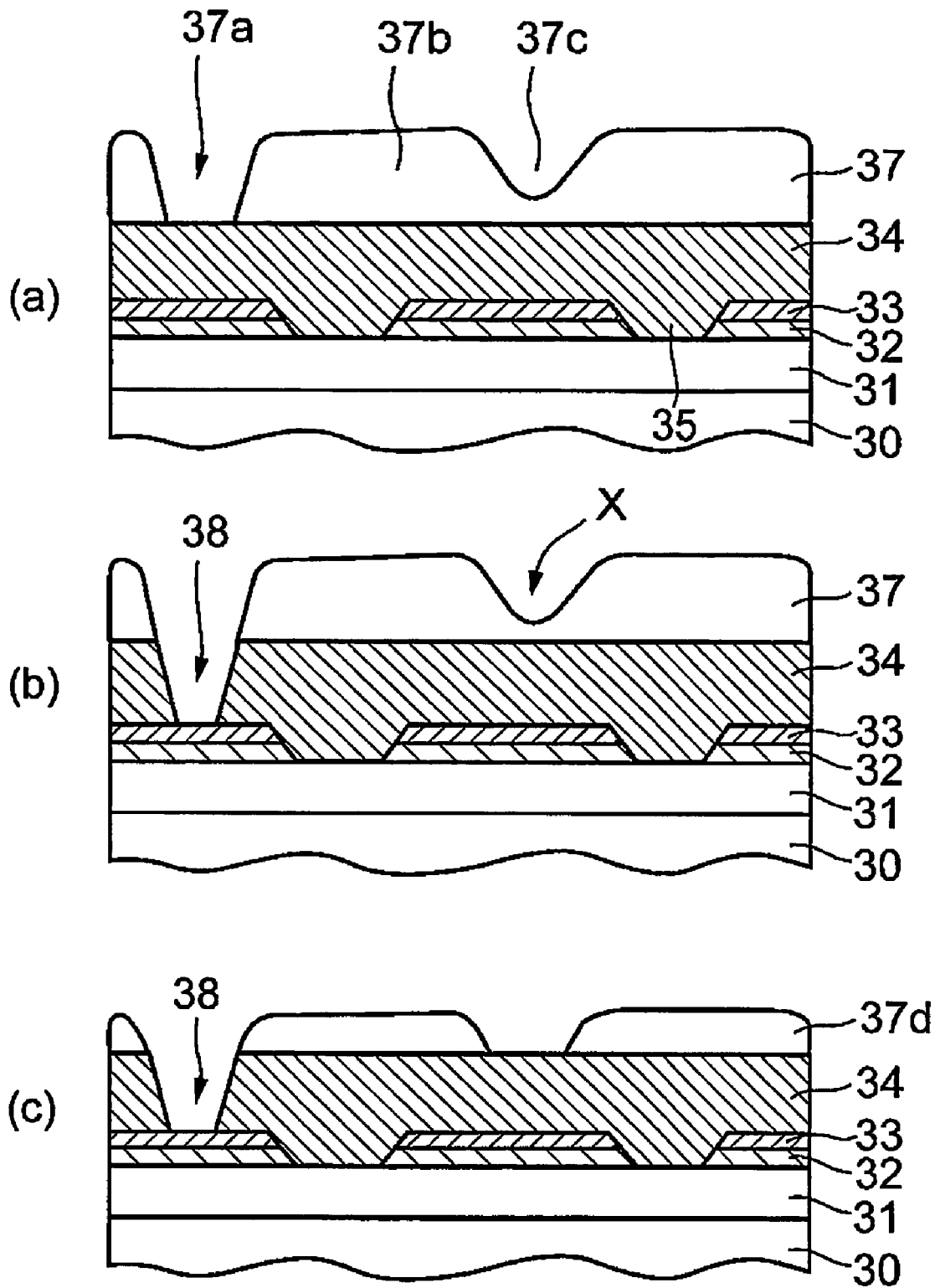
FIGS. 7(a) to 7(c) show a process of manufacturing an ESD protection circuit according to an Embodiment of the present invention.
Figure 8:
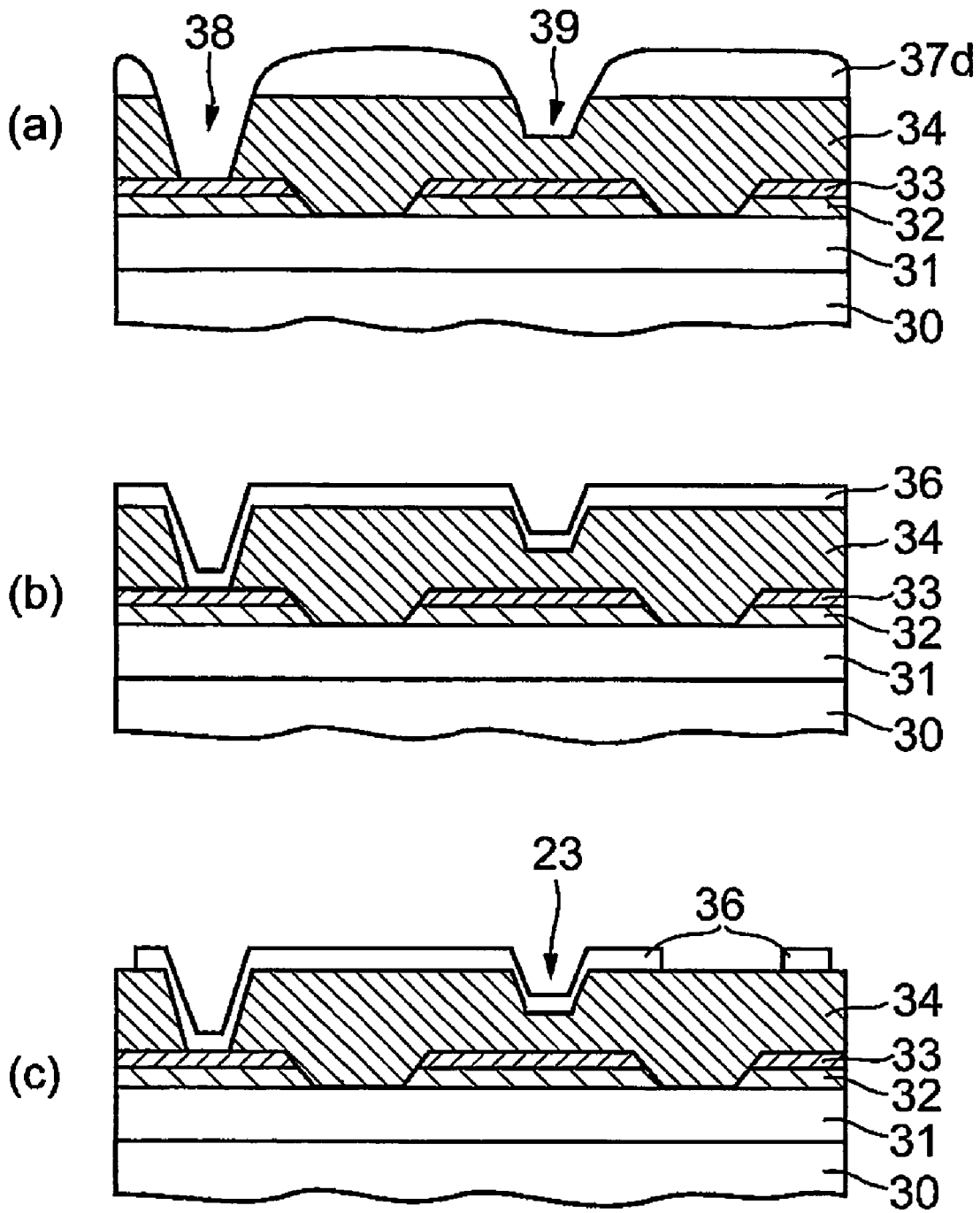
FIGS. 8(a) to 8(c) show a process of manufacturing an ESD protection circuit according to an Embodiment of the present invention.

Next, the method for manufacturing a liquid crystal display device having an ESD protection circuit according to this embodiment will be explained using FIG. 7 and FIG. 8. FIGS. 7(a) to (c) and FIGS. 8(a) to (c) show processes of manufacturing an ESD. protection circuit according to an Embodiment of the present invention.

First, as shown in FIG. 7(a), a silicon oxide film 31, which is an interlayer insulating film, is formed on a glass substrate 30. Next, an ITO film 32 and a metal film 33 are formed one by one on the silicon oxide film 31 and an opening (gap) 35 is formed through a photolithography process and an etching process. This opening is tapered in such a way that the width of the opening becomes narrower toward the silicon oxide film 31 to improve the coverage of the film formed thereon.

Then, a silicon nitride film 34 is formed on the metal film 33 having the opening and the material for an organic film 37 is applied thereon and then the organic film 37 is formed. This organic film 37 is patterned using a mask for which amount of exposure is varied depending on a place, for example, a half-tone mask. As the material for the organic film 37, a photo-sensitive resist, etc., can be used.

This half-tone mask has a light shield portion which shields the light, a semi-transparent portion (relatively small amount of exposure) which allows a part of light to pass, and a transparent portion (relatively large amount of exposure) which allows the whole light to pass. The transparent portion of the half-tone mask is provided so as to correspond to the region of the gate insulating film in which a contact-hole is formed, the light shield portion is provided so as to correspond to the gap 35 and the semitransparent portion is provided so as to correspond to the region in which an MIM structure is formed.

When the organic film is exposed using this half-tone mask, the whole exposure light passes through the transparent portion and a part of the exposure light passes through the semitransparent portion. On the other hand, no exposure light passes through the light shield portion. When a development process is applied to the exposed organic film, most of the organic film 37 in the portion 37a corresponding to the transparent portion is removed. Furthermore, the organic film 37 of the portion 37c corresponding to the semitransparent portion is partially removed. On the other hand, substantially all the organic film 37 of the portion 37b corresponding to the light shield portion remains. In this way, as shown in FIG. 7(a), the organic film 37 consisting of the portions 37a to 37c having different thickness is formed through a single mask process. Next, as shown in FIG. 7(b), the silicon nitride film 34 exposed through the opening 37a using the organic film 37 as a mask is subjected to dry etching to form a contact-hole 38. This dry etching is performed to remove the silicon nitride film 34 in the region in which a contact-hole is formed, and therefore it is possible to change the used gas and condition appropriately.

Next, as shown in FIG. 7(c), the organic film 37 is subjected to dry etching, the overall thickness of the organic film 37 is reduced and the silicon nitride film 34 in a region X in which an MIM is formed is exposed (formation of the opening). At this time, when the organic film 37 remains on the silicon nitride film 34 in the region X in which the MIM is formed, it is preferable to remove the organic film 37 by ashing, etc. This dry etching is performed to remove the organic film 37 in the region in which the MIM is formed, and therefore it is possible to change the used gas and condition appropriately. Furthermore, the exposed silicon nitride film 34 (region in which the MIM is formed) can be detected by an EPD (End Point Detector). Furthermore, by performing dry etching in inductively coupled plasma (ICP) mode or reactive ion etching (RIE) mode, it is possible to reduce the thickness of the organic film 37 uniformly, and therefore it is possible to maintain the convexo-concavo shape after dry etching.

Next, as shown in FIG. 8(a), using the organic film 37d of a reduced thickness as a mask, the exposed silicon nitride film 34 (region X in which the MIM is formed) is subjected to dry etching to form a hollow portion 39 in the silicon nitride film 34 of the region X in which the MIM is formed. This dry etching is performed to remove the silicon nitride film 34 in the region in which the hollow portion 39 is formed, and therefore it is possible to change the used gas and condition appropriately.

Next, as shown in FIG. 8(b), the organic film on the silicon nitride film 34 is removed and a gate bus layer 36 is formed on the silicon nitride film 34. At this time, the metal film 33 for the source and drain electrodes and the gate bus layer 36 are connected in the region of the contact-hole 38. Then, as shown in FIG. 8(c), the gate bus layer 36 is patterned through a photolithography process and etching process. In this way, it is possible to form a structure having the MIM 23 as the ESD protection circuit.

According to the above-mentioned method, it is possible to manufacture an ESD protection circuit using MIMs without increasing mask processes compared to the case where an ESD protection circuit is configured using TFTs.

An array substrate is manufactured in this way and an opposed substrate is manufactured using a normal method and these array substrate and opposed substrate are assembled into an active matrix type liquid crystal display device.

The present invention is not limited to the above-mentioned embodiment, but can be implemented by changing the condition, material and the used gas in various ways. For example, the material and the structure used in the above-mentioned embodiment are not limited, and alternate materials and alternate structure capable of exhibiting the equivalent functions may be used. That is, the above-mentioned embodiment has explained the case where a silicon oxide film is used as the interlayer insulating film and a silicon nitride film is used as the gate insulating film, but any other material may also be used in the present invention if it exhibits at least the equivalent functions. Furthermore, the thickness of the respective films are not particularly limited if they exhibit the functions of the respective films.

Furthermore, the above-mentioned embodiment has explained the case where a half-tone mask is used, but it is possible to use a diffraction mask having a light shield portion, transparent portion and semitransparent portion (micro pattern section with limit resolution or below) to form an organic film having a thick film portion and opening according to the present invention. In the case of this diffraction mask, a small pattern with limit resolution or below of an exposure apparatus is formed and this portion is used as a semitransparent portion. When the light is diffracted through this small pattern, the weak light passes through the mask.

As described above; the present invention uses an MIM structure as the ESD protection circuit, and can thereby form MIMs which exhibit a characteristic preferable to that in the case where a saturation region of a TFT is used in a smaller occupied area and realize space saving and a high degree of integration.

Furthermore, the present invention uses MIMs for the ESD protection circuit, and can thereby form the ESD protection circuit in a smaller region with simpler processes. In this case, using a mask for which amount of exposure is varied depending on a place, it is possible to form the ESD protection circuit without increasing mask processes.

INDUSTRIAL APPLICABILITY

The present invention is applicable to an active matrix type liquid crystal display device.

The invention claimed is:

1. A liquid crystal display device having an ESD protection circuit comprising:
    a source electrode and a drain electrode formed on an insulating substrate via an interlayer insulating film;
    a gate insulating film having a plurality of hollow portions over said source electrode and said drain electrode to provide a relatively thin film portion partially on said source electrode and said drain electrode and a relatively thick film portion between said source electrode and said drain electrode; and
    a gate bus layer formed on said gate insulating film including at least said thin film portion,
    wherein an MIM structure is configured by said source electrode, said drain electrode, said gate insulating film in said thin film portion and said gate bus layer.

2. The device as claimed in claim 1, wherein a plurality of said MIM structures are connected in series.

3. The device as claimed in claim 1, wherein said thin film portion has a thickness of 50 nm or less.

4. A method for manufacturing a liquid crystal display device having an ESD protection circuit comprising the steps of:
- forming a source electrode and a drain electrode on an insulating substrate via an interlayer insulating film;
- forming a gate insulating film having a plurality of hollow portions over said source electrode and said drain electrode to provide a relatively thin film portion partially on said source electrode and said drain electrode and a relatively thick film portion between said source electrode and said drain electrode; and
- forming a gate bus layer on said gate insulating film including at least said thin film portion,
- wherein an MIM structure is configured by said source electrode, said drain electrode, said gate insulating film in said thin film portion and said gate bus layer.

5. The method as claimed in claim 4, wherein said step of forming said thin film portion in said gate insulating film includes the steps of:
- forming an organic film on said gate insulating film;
- exposing said organic film using a mask for which the amount of exposure in said thin film portion is relatively low, developing the exposed organic film;
- exposing said gate insulating film in said thin film portion by reducing the thickness of the developed organic film; and
- forming said hollow portions by etching said exposed gate insulating film.

6. The method as claimed in claim 5, wherein said mask includes a portion having a relatively large amount of exposure, said organic film is exposed through said portion, and a contact-hole is formed in a region where the exposed organic film is developed.

7. The method as claimed in claim 5, wherein a half-tone mask or a diffraction mask is used as said mask for which an amount of exposure in said thin film portion is relatively low.

8. The device as claimed in claim 1, wherein said plurality of hollow portions are formed directly above said source electrode and said drain electrode.

9. The device as claimed in claim 1, wherein said gate insulating film has a larger thickness in areas without the source electrode and the drain electrode formed thereon than areas with said source electrode and said drain electrode formed thereon.

* * * * *